Feb. 13, 1968           K. GRIESE           3,368,440
SHEARING MACHINES FOR TRIMMING SHEET MATERIAL
Filed April 1, 1966
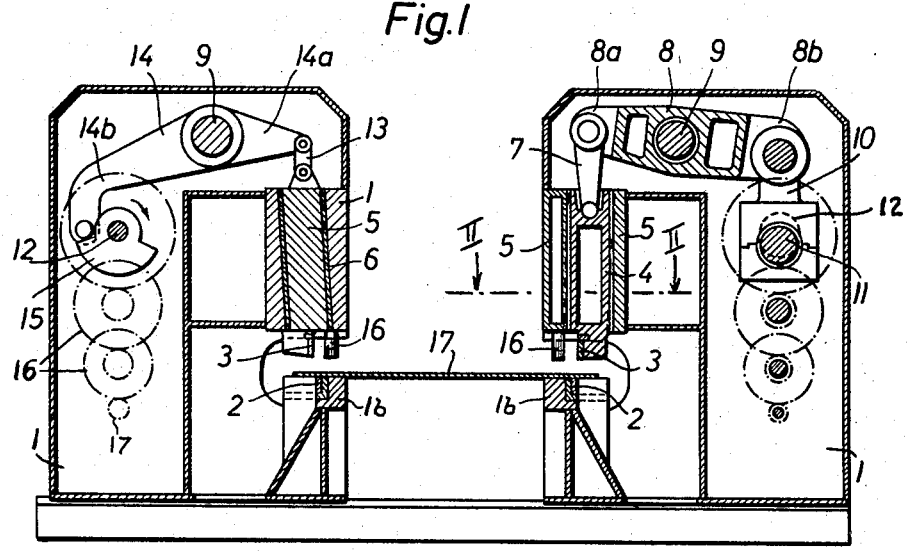
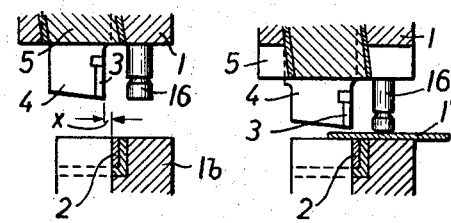 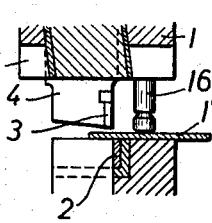 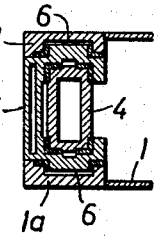

United States Patent Office 3,368,440
Patented Feb. 13, 1968

3,368,440
SHEARING MACHINES FOR TRIMMING
SHEET MATERIAL
Karl Griese, Dusseldorf-Rath, Germany, assignor to Maschinenfabrik Sack G.m.b.H., Dusseldorf-Rath, Germany, a corporation of Germany
Filed Apr. 1, 1966, Ser. No. 539,362
4 Claims. (Cl. 83—513)

My invention relates to shearing machines for trimming metal sheets and other sheet material.

Such machines, as a rule, have a stationary lower blade coacting with an upper blade which reciprocates vertically in the frame structure of the machine. Often the disadvantage is encountered that, as the upper blade moves upward after completing a cut, it rubs with heavy friction against the newly cut edge of the sheet. If the sheet is thin, its edge then gets dragged upwards with the blade, and this may deform the sheet. When thicker plate is cut, the powerful friction then arising causes excessive wear of the upper blade and involves a great wastage of power.

It is an object of my invention to overcome these disadvantages.

To this end, and according to the invention, the upper blade of such a shearing machine is guided in an intermediate slider to move in or parallel to the cutting plane; the intermediate slider is guide to move in a direction inclined to the cutting plane; and the upper blade and the intermediate slider are moved by driving mechanisms which cause the upper blade to move downward in the cutting plane to make a cut and then to be moved sideways from this plane by movement of the intermediate slider so that the upward movement of the upper blade takes place in a plane offset sideways from the cutting plane.

In this way the detrimental friction between the cut sheet and the upwardly moving upper blade is eliminated.

According to another feature of the invention, the movements of a carrier for the upper blade and of the intermediate slider are derived from a single drive shaft. To this end, the blade carrier and the intermediate slider are connected through links to respective levers which rock about a common axle and are driven independently of each other by respective cam means mounted on the common driving shaft.

An embodiment of a shearing machine according to the invention is diagrammatically illustrated by way of example in the accompanying drawings in which:

FIG. 1 is a vertical section through two exactly similar shearing machines facing each other, one of them being slightly displaced relative to the other in a direction normal to the plane of illustration which is the travel direction of a sheet having its edges trimmed by the two machines.

FIG. 2 is a horizontal section through an upper part of the machine shown at the right in FIG. 1, the section being along the line II—II in FIG. 1.

FIGS. 3 and 4 are both vertical sections through the blades of the machine shown on the left in FIG. 1, drawn to a larger scale and showing respectively different blade positions in the course of movement of the upper blade.

Each of the two machines has a lower blade 2 fixed in a frame structure 1. An upper blade 3 is mounted on a carrier 4 which is guided to move vertically in an intermediate slider 5. The slider can move up and down and is guided by and between cheeks 1a (FIG. 2) of the frame structure 1. The slider 5 moves up and down in inclined grooves 6 of the cheeks. The grooves 6 are inclined at an angle to the plane of the cut in such a fashion that when the intermediate slider 5 is in its uppermost position as shown at the left of FIG. 1 and in FIG. 3, the carrier 4 of the upper blade 3 holds the cutting edge of the blade offset from the cutting plane by a distance $x$. When subsequently the slider 5 moves downward, the blade 3 is moved sideways until it reaches the plane of cut. Further downward movement of the blade carrier 4 in its vertical guides, the intermediate slider 5 then being stationary, moves the upper blade 3 downward from the position shown in FIG. 4, and the cut is made in a vertical plane.

In FIG. 1, on the right-hand side, it is seen how the carrier 4 for the upper blade is suspended by a link 7 from an arm 8a of a double-armed lever 8, which rocks about a stationary axle 9 mounted in the upper part of the frame structure 1. The other arm 8b of lever 8 is connected through a connecting rod 10 to an eccentric 11 on a driving shaft 12, which rotates in the frame structure 1.

At the left-hand side of FIG. 1 it is seen how the intermediate slider 5 is connected through a link 13 to one arm 14a of a double-armed lever 14 which also rocks about the axle 9. The other arm 14b of lever 14 is constantly held in contact with a cam disc 15, which rotates with the driving shaft 12. This single cam disc 15 has a steep cam contour to move the slider 5 rapidly between its two end positions, whereas between these rapid movements the slider is held in its two end positions for comparatively long periods. In contrast, the eccentric 11 drives the carrier 4 with its blade 3 in a simple harmonic movement.

The intermediate slider 5 is provided with hold-downs 16 for clamping a sheet 17 being trimmed onto an anvil or abutment 1b which forms part of the frame structure 1. In this way the guides and actuators usually necessary to effect clamping are eliminated.

If desired, the carrier for the upper blade and also the intermediate slider can be reinforced or compensated in their movements by springs or hydraulic rams (not shown) in the well known way. Moreover, the upper blade carrier and the intermediate slider can be actuated, instead of by cams, either directly or indirectly by suitably controlled hydraulic or electrical drives.

In each of the two illustrated shearing machines, the two cam means 11, 15 for moving the respective levers 8 and 13 are mounted on a single shaft 12 driven by a train of spur gears 16 from a pinion 17, such as the drive pinion of an electric motor.

It will be recognized that in a shearing machine according to the invention, the upper blade, after completing the cut, is withdrawn by moving the intermediate slider away from the sheet in a direction inclined to the plane of the cut. Then the upper blade is moved upwardly without touching the sheet. Subsequently, the intermediate slider is moved back toward the cutting plane, whereafter the upper blade is again moved downward to perform a new cutting operation.

Thus, in the illustrated machines care is taken that the upper blade is situated in its cutting plane before beginning the downward cutting stroke, and is situated in a plane offset from the cut face before beginning its upward return stroke. Accordingly, the cam 15 and the eccentric 11 which drive the intermediate slider 5 and the upper blade carrier 4 respectively, are angularly so set relative to each other that at each reversal in stroke direction, the movement of the intermediate slider 5 precedes that of the upper blade 3.

I claim:
1. A shearing machine for trimming sheet material, comprising a frame structure, a stationary lower blade on said structure, a reciprocating upper blade for shearing action with said lower blade in a given cutting plane, a slider guiding said upper blade for reciprocation in said plane, means guiding said slider for movement in a direction inclined to said plane, drive mechanisms connected to said upper blade and to said slider respectively and having a driving cycle for causing said upper blade to move downward in said plane to make a cut and then moving said slider with said upper blade away from the cut so that upward movement of said upper blade takes place in a plane offset from said cutting plane.

2. A shearing machine according to claim 1, comprising a carrier on which said upper blade is mounted, two levers having a fulcrum axis in common and being rockable independently of each other, one of said levers being linked to said carrier and the other lever being linked to said slider, two cam means having respective followers connected with said two levers for individually driving said levers, said two cam means having a drive shaft in common.

3. In a shearing machine according to claim 2, said cam means for driving said blade carrier being an eccentric for substantially harmonic motion, and said cam means for said slider having a steep-flank cam contour for abrupt motion of said slider between two limit positions.

4. In a shearing machine according to claim 2, said two cam means having relative to each other an angular position at which the movement of said slider precedes that of said upper blade at each directional reversal of motion.

References Cited

UNITED STATES PATENTS 3,246,552  4/1966  Sieger _____83—556 X
3,263,546  8/1966  Musly et al. _____ 83—556

JAMES M. MEISTER, *Primary Examiner.*